3,060,185
HYDROXAMIC ACID ESTERS OF ALKANOLAMINES

Jean Druey, Riehen, and Kurt Eichenberger, Basel, Switzerland, assignors to Ciba Corporation, a corporation of Delaware
No Drawing. Filed Apr. 17, 1959, Ser. No. 807,020
Claims priority, application Switzerland Apr. 30, 1958
9 Claims. (Cl. 260—294)

This invention relates to aminoalkanol esters of aliphatic hydroxamic acids, their salts, amine-oxides and quaternary ammonium derivatives.

In the new compounds the aliphatic radical of the hydroxamic acid is especially a higher saturated or unsaturated fatty acid radical, for example, one having 10–22 carbon atoms such as capric, undecylic, lauric, myristic, palmitic, stearic, nondecylic, arachic, behenic, undecylinic, oleic, or erucic acid radicals. The new esters are derived in the first place from amino or ammonium group substituted lower alkanols, such as ethanol, propanol, butanol, pentanol or hexanol, in which the amino or ammonium group is separated from the oxygen atom of the ester group by at least 2 carbon atoms.

The amino group is advantageously substituted, especially di-substituted or quaternated. Substituents are in the first place unsubstituted or substituted alkyl, alkenyl, alkylene, aza, oxa, or thia-alkyl or alkylene, cycloalkyl, aralkyl such as benzyl, aryloxyalkyl such as phenyloxyalkyl or heterocyclylalkyl radicals. Such radicals are, for example, methyl, ethyl, propyl, butyl, pentyl, butylene-(1:4), pentylene-(1:5), 3-oxa- or 3-aza-pentylene-(1:5), benzyl, phenoxyethyl or tetrahydro-furfuryl.

The new compounds possess valuable properties. Thus they are active as antibacterial and anti-mycotic agents. Furthermore, they intensify the immunizing reactions brought about by antigens, such as horse serum, borine serum, albumin, crystalline ovalbumin, human gamma globulin etc., since they, for example, increase the formation of antibodies. They may accordingly be used as disinfectants, medicaments or as additive to vaccines.

Especially valuable are compounds of the formula

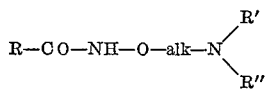

and their salts or more particularly compounds of the formula

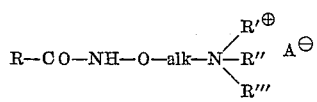

in which R represents an alkyl or alkenyl radical having 9–21 carbon atoms, advantageously the alkyl group $C_{17}H_{35}$, "alk" represents propylene, butylene or preferably ethylene, and R'—R''' represent alkyl radicals or, though less preferably, one of them may represent a benzyl- or phenoxy- ethyl-group, and A represents the anion of an acid, above all, stearyl-hydroxamic acid-(β-diethyl-methyl-ammonium-ethyl)-ester-salts, such as halides, for example, the chloride of the formula

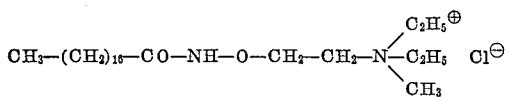

The new compounds may be obtained by methods known in themselves. Thus an aliphatic acid, if desired in the form of a reactive functional derivative such as an ester, halide, amide or anhydride, is reacted with an O-(amino-alkyl)-hydroxylamine.

The reactions may be carried out in known manner, if desired in the presence of condensation agents, in the presence or absence of diluents, at usual or raised temperature, and in an open or closed flask. Especially in the case of the reaction of aliphatic acid chlorides with hydroxyl amines the use of an acid-binding condensation agent is recommended. The starting materials may also be used in the form of their salts.

Tertiary amines obtained can be converted into quaternary ammonium compounds by reaction with quaternating agents, especially reactive esters of alcohols, above all of alkanols, aralkanols or aryloxy-alkanols. Reactive esters are especially those of strong inorganic or organic acids, such as hydrogen halides, sulfuric acid or organic sulfonic acids such as benzene- or toluene-sulfonic acids.

According to the process conditions the new compounds are obtained in the form of the free bases or their acid addition or quaternary salts. The free bases can be obtained from the acid addition or quaternary salts in known manner, for example, by treatment with alkalies or in the case of the quaternary salts also with anion-exchangers. The free bases can be converted back into the salts in the usual way, for example, by reaction with acids. Quaternary salts may also be converted into other quaternary salts by customary methods. Examples of acids suitable for salt-formation are hydrogen halides, such as hydrochloric acid, hydrobromic acid or hydriodic acid, sulfuric acid, nitric acid, phosphoric acids, perchloric acid, alkylsulfonic acids, such as methane-, ethane- or hydroxyethane-sulfonic acids, benzenesulfonic acids, such as para-toluene sulfonic acid, naphthalene-sulfonic acids, acetic, proprionic, oxalic, tartaric, citric, lactic or maleic acid, benzoic acid, salicylic acid, para-amino-salicylic acid, amino acids or alkyl sulfuric acids, such as methyl sulfuric acid. Resulting tertiary bases can be converted into their amine-oxides in the customary manner.

The starting materials are known or may be obtained by methods known in themselves. Advantageously there are used those starting materials which lead to the especially outstanding final products mentioned above.

The new compounds obtained according to the invention can be used as disinfectants in the form of industrial preparations, for example, together with the usual filling materials and/or diluents. The new compounds may be used for pharmaceutical purposes in admixture with a suitable pharmaceutical organic or inorganic carrying material for enteral, parenteral or topical application. For this purpose there come into consideration such substances as do not react with the compounds of the invention, as for example, gelatine, water, lactose, vaseline, starches, magnesium stearate, talc, vegetable oils, benzyl alcohols, gums, polyalkylene glycols, cholesterol or other known pharmaceutical carriers. The pharmaceutical preparations may be made up, for example, in the form of tablets, dragees, salves or in liquid form as solutions, suspensions or emulsions. If desired they may be sterilized and/or may contain adjuvants such as preservatives, stabilizers, wetting agents or emulsifying agents. They may also contain other therapeutically valuable substances. Furthermore, they may also be used as adjuvants in admixture with vaccines. The preparations can be obtained in accordance with usual methods.

The following examples illustrate the invention:

Example 1

15.15 grams of stearyl chloride (stearic acid chloride) are dissolved in 100 cc. of dioxane in a flask fitted with a stirrer. After the addition of 15.8 grams of pyridine there are added dropwise with stirring and at room temperature 7.26 grams of O-(β-diethylamino-ethyl)-hydroxylamine in 20 cc. of dioxane, whereupon the temperature inside the flask rises to about 35° C. Then the clear reaction mixture is stirred for a further hour at a temperature of 80 to 90° C. The solution is now evaporated to dryness in vacuo, the residue treated with 50 cc. of 1-N-caustic soda and 50 cc. of water and extracted with ether. From the evaporated ethereal solution there is obtained stearyl-hydroxamic acid-(β-diethyl-amino-ethyl)-ester.

3.98 grams of stearyl-hydroxamic acid-(β-diethyl-amino-ethyl)-ester are dissolved in 30 cc. of alcohol and 10 cc. of N-hydrochloric acid are added. The solution is evaporated to dryness under reduced pressure and the residue crystallized several times from ethyl acetate. Stearyl-hydroxamic acid-(β-diethylamino-ethyl)-ester hydrochloride is obtained. A test portion is transparent at about 80° C. and melts at 127° C.

3.98 grams of stearyl-hydroxamic acid-(β-diethyl-amino-ethyl)-ester are boiled under reflux in 20 cc. of ether and 2 cc. of methyl iodide for 20 minutes. After cooling there crystallizes from the reaction solution pure stearyl - hydroxamic acid - (β - N,N - diethyl - N - methyl - ammonium - ethyl) - ester iodide of the formula

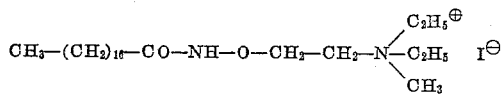

A test portion is clear at 87° C. and melts at 207° C.

*Example 2*

10.8 grams of stearyl-hydroxamic acid-(β-N,N-diethyl-N-methylammonium-ethyl)-ester iodide are suspended in 570 cc. of water and agitated with 14.3 grams of freshly prepared silver chloride for 12 hours at room temperature. The insoluble portion is then separated by centrifuging. The still turbid solution is evaporated under reduced pressure at a temperature of 30–40° C. The residue is taken up in methanol, treated with charcoal and filtered. The resulting clear solution is evaporated under reduced pressure and the residue crystallized from acetone. Stearyl - hydroxamic acid - (β-N,N-diethyl-N-methylammonium-ethyl)-ester chloride of the formula

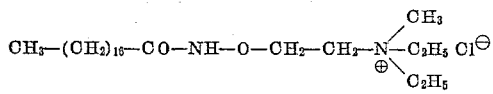

is obtained. A test portion is transparent at 110° C. and melts at 200° C.

*Example 3*

15.15 grams of stearyl chloride are dissolved in 100 cc. of dioxane in a flask fitted with stirring means. After adding 15.8 grams of pyridine, 5.72 grams of O-(β-dimethylamino-ethyl)-hydroxylamine in 20 cc. of dioxane are added dropwise with stirring at room temperature, the internal temperature of the flask rising to about 37° C. The reaction solution is then stirred for another hour at 80–90° C. The whole is evaporated to dryness under reduced pressure, 50 cc. of N-sodium hydroxide solution and 50 cc. of water are added to the residue and immediately extracted with ether. From the evaporated ethereal solution there is obtained stearyl-hydroxamic acid - (β - dimethylamino - ethyl) - ester which can be used for quaternizing as follows:

3.7 grams of stearyl-hydroxamic acid - (β-dimethyl-amino-ethyl)-ester are boiled under reflux in 20 cc. of ether and 2 cc. of methyl iodide for 20 minutes. After cooling, the precipitated crystals are suction-filtered and recrystallized from acetone. Stearyl-hydroxamic acid-(β-trimethylammonium-ethyl)-ester iodide of the formula

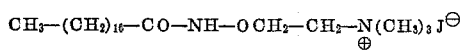

is obtained. A test portion is transparent at 78° C. and melts at 225° C.

*Example 4*

30.3 grams of stearyl chloride are dissolved in 200 cc. of dioxane in a flask fiitted with stirring means. After adding 32.3 cc. of pyridine, 15.84 grams of O-(β-piperidino-ethyl)-hydroxylamine in 40 cc. of dioxane are added dropwise with stirring at room temperature. The reaction solution is then stirred for another hour at 80–90° C. internal temperature. The mixture is evaporated to dryness under reduced pressure, 100 cc. of N-sodium hydroxide solution and 100 cc. of ice water are added to the residue, and extraction is carried out with ether. From the evaporated ethereal solution there is obtained stearyl-hydroxamic acid-(β-piperidino-ethyl)-ester which can be quaternized as follows:

80 cc. of ether are added to 4 grams of stearyl-hydroxamic acid-(β-piperidino-ethyl)-ester. 8 cc. of methyl iodide are added and the whole is boiled under reflux for 20 minutes. After cooling, the mixture is allowed to stand for some time, the precipitated crystals are then suction-filtered and recrystallized from acetone. Stearyl-hydroxamic acid-(β-N-methyl-piperidinium-ethyl)-ester iodide of the formula

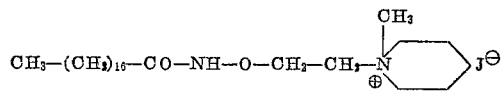

is obtained. The substance becomes transparent at 79° C. and melts at 188° C.

*Example 5*

22 grams of lauric acid chloride are dissolved in 200 cc. of dioxane in a flask fitted with stirring means. After adding 32.3 cc. of pyridine, 14.52 grams of O-(β-diethyl-amino-ethyl)-hydroxylamine in 40 cc. of dioxane are added with stirring at room temperature. The whole is then stirred for another hour at 80–90° C. internal temperature, evaporated to dryness under reduced pressure, 100 cc. of N-sodium hydroxide solution and 100 cc. of ice water are added to the residue and extraction is carried out with ether. From the evaporated ethereal solution there is obtained lauryl-hydroxamic acid-(β-diethylamino-ethyl)-ester which can be quaternized as follows:

5 grams of the above product are dissolved in 25 cc. acetone, the solution is filtered, 5 cc. of methyl iodide are added and the whole boiled under reflux for 20 minutes. After cooling, the mixture is allowed to stand for some time, the crystals are suction-filtered and recrystallized from acetone. Lauryl-hydroxamic acid-(β-N,N-diethyl)-N-methylammonium ethyl)-ester iodide of the formula

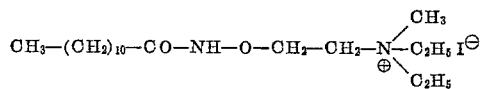

is obtained. The substance becomes transparent at 70° C. and melts at 76° C.

What is claimed is:

1. A member selected from the group consisting of compounds having the formula

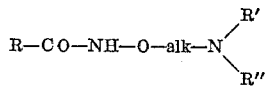

in which R—CO represents the acyl radical of a fatty acid containing from 10 to 22 carbon atoms, R' and R'' each stand for a member selected from the group consisting of lower alkyl, benzyl, phenoxyethyl, tetrahydrofurfuryl and, when taken together with the nitrogen atom, a member selected from the group consisting of pyrrolidino, piperidino, morpholino and piperazino and "alk" designates lower alkylene, separating the tertiary amino group from the ester oxygen atom by 2 to 6 carbon atoms, therapeutically useful acid addition salts and quaternary lower alkyl, benzyl and phenoxy lower alkyl ammonium salts of therapeutically useful acids.

2. Stearyl-hydroxamic acid-($\beta$-tri-lower alkyl ammonium-ethyl)-ester salts of therapeutically useful acids.

3. Stearyl - hydroxamic acid-($\beta$-N,N-diethyl-N-methyl-ammonium-ethyl)-ester salts of therapeutically useful acids.

4. Stearyl - hydroxamic acid-($\beta$-trimethyl - ammonium-ethyl)-ester salts of therapeutically useful acids.

5. Stearyl-hydroxamic acid-($\beta$-N-methyl-piperidinium-ethyl)-ester salts of therapeutically useful acids.

6. Lauryl - hydroxamic acid-($\beta$-N,N-diethyl-N-methyl-ammonium-ethyl)-ester salts of therapeutically useful acids.

7. Stearyl-hydroxamic acid-($\beta$-piperidino-ethyl)-ester.

8. Lauryl - hydroxamic acid - ($\beta$ - diethylamino-ethyl)-ester.

9. Stearyl - hydroxamic acid-($\beta$-di-lower alkyl - amino-ethyl)-ester.

References Cited in the file of this patent
UNITED STATES PATENTS

| | | |
|---|---|---|
| 2,459,062 | Cook et al. | Jan. 11, 1949 |
| 2,459,088 | Moss et al. | Jan. 11, 1949 |
| 2,523,934 | Albrecht et al. | Sept. 26, 1950 |
| 2,590,073 | Albrecht | Mar. 25, 1952 |
| 2,836,517 | Gruber et al. | May 27, 1958 |